INVENTOR
GEORGE W. JACKSON
BY
ATTORNEYS

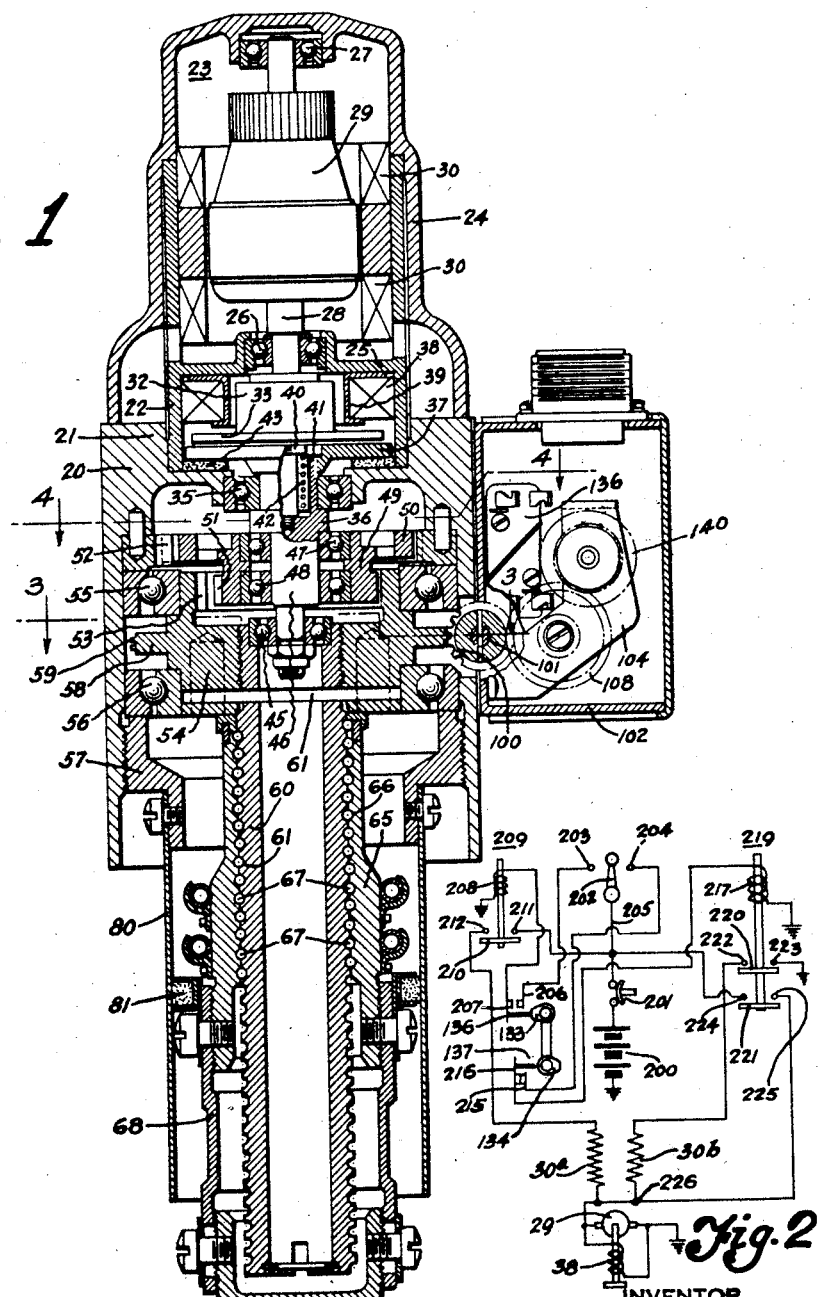

April 1, 1947.  G. W. JACKSON  2,418,351
ACTUATOR CONTROL
Filed March 14, 1945  3 Sheets—Sheet 3

INVENTOR
GEORGE W. JACKSON
BY
HIS ATTORNEYS

Patented Apr. 1, 1947

2,418,351

UNITED STATES PATENT OFFICE 2,418,351

ACTUATOR CONTROL

George W. Jackson, Dayton, Ohio, assignor to General Motors Corporation, Detroit, Mich., a corporation of Delaware Application March 14, 1945, Serial No. 582,771

16 Claims. (Cl. 192—142)

This invention relates to an improved control device for a reversible electric motor.

It is among the objects of the present invention to provide a control device for a reversible electric motor, operative to stop motor operation in either direction in accordance with the number of revolutions of a member driven by said motor.

A further object of the present invention is to provide a control device for an electric motor connected to a member adapted to be rotated a predetermined number of revolutions in either direction, said control device being operative by said member quickly to stop motor operation when the limit of rotations of said member in either direction is reached.

A still further object of the present invention is to provide an electric motor connected to a member for rotating it in either direction with a control device driven by said member and capable of being adjusted to stop motor operation in accordance with any predetermined equal number of revolutions of said member in either direction.

Further objects and advantages of the present invention will be apparent from the following description, reference being had to the accompanying drawings, wherein a preferred embodiment of the present invention is clearly shown.

The above and other objects are accomplished by providing the electric motor with control mechanisms comprising limit switches connected in circuit with the motor and adapted to be actuated to control motor operation. Cams actuate the switches and a set of timing gears operatively connect the cams with a member rotated by the motor a predetermined number of revolutions in either direction.

The switches are designed normally to close their gap in the circuits, each of which is primarily controlled by a master switch of the selector type. As the motor driven member is rotated, the timing gears connected thereto will actuate the cams, one of which becomes effective to open its switch for stopping the motor when the member reaches its predetermined limit of revolutions in this one direction. When the motor operates in the opposite direction, the open switch will be permitted to close and after the member has been rotated the predetermined number of revolutions, the other cam will actuate its switch to open the circuit and stop motor operation in this direction.

One gear of the train of gears between the motor driven member and each switch operating cam is a single tooth gear operative intermittently to engage and actuate the cam driving gear through portions of its complete revolution. This intermittent movement provides for quick rotation of the cam through each portion of its revolution and especially through that portion in which it actuates its switch. Thus much greater sensitivity is obtained than would be available if conventional gears were used in which case very slow action would obtain. The single tooth gear is adjustable relatively to its respective cam gear, thereby rendering the device operative in response to any desired number of revolutions of the motor driven member.

In the present invention the motor is shown applied to an actuator which comprises a screw shaft, driven by the motor and having a nut thereon. The nut is arranged to have a load applied thereto which holds the nut non-rotatable and therefore longitudinally movable on the screw shaft in response to rotation thereof for moving the load between two extreme predetermined positions.

In the drawings:

Fig. 1 is a longitudinal sectional view taken through the complete actuator.

Fig. 2 is a wiring diagram showing the various electrical units and their electrical connections, as used with the actuator.

Figure 3:
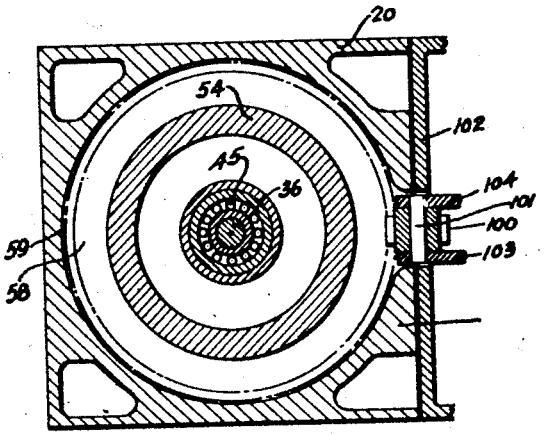
Fig. 3 is a fragmentary cross section taken along the line 3—3 of Fig. 1.
Figure 4:
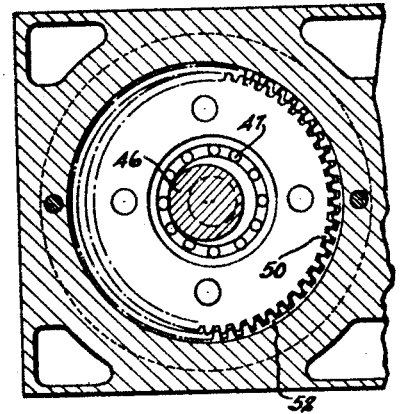
Fig. 4 is a view similar to Fig. 3 but taken along the line 4—4 of Fig. 1.
Figure 5:
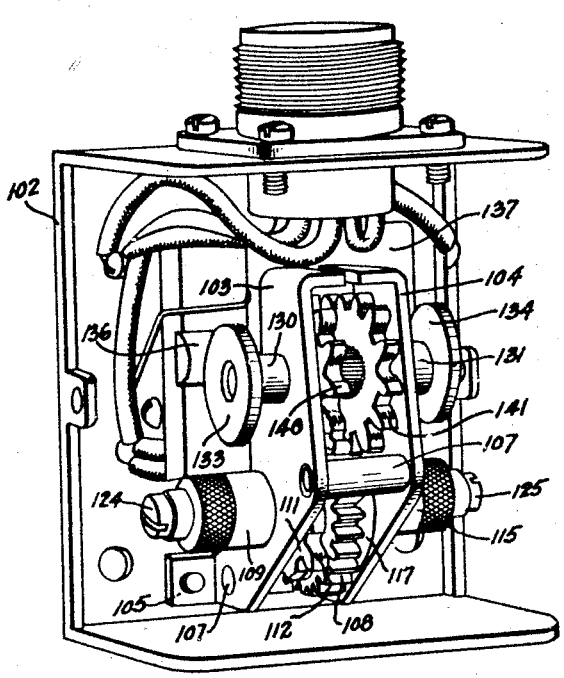
Fig. 5 is a perspective view of the control mechanism.
Figure 6:
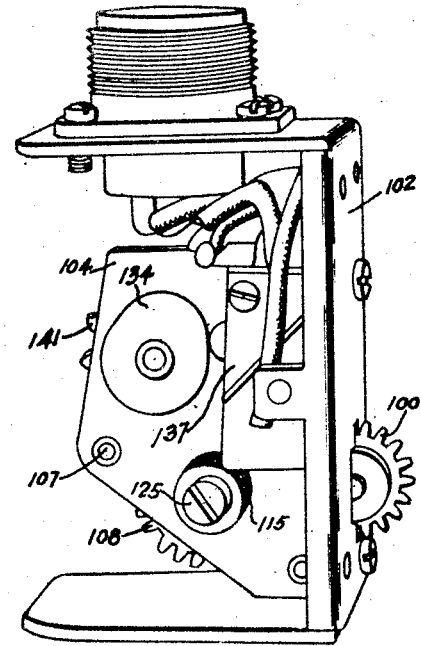
Fig. 6 is another perspective view of the control mechanism.

The actuator of the present invention is shown in Fig. 1 as comprising a main housing 20 having an end wall 21 which is centrally recessed to receive the one end of the cylindrically shaped stator housing 22 of the electric motor 23. The motor housing 24 has a portion fitting about the stator housing 22. One end of the housing 24 is closed, the other is bell-shaped and open, its peripheral edge resting upon the main housing 20. The stator housing 22 has a partition 25, centrally apertured to receive the bearing assembly 26 which is in coaxial alignment with a similar bearing assembly 27 supported in a recess in the closed end wall of the motor housing 24.

Bearings 26 and 27 rotatably support the shaft 28 of the motor armature 29. Suitable field or stator windings 30 are carried by the stator housing 22. The brushes of the motor are not shown, however, any suitable brush structure may be used.

The armature shaft 28 extends through the bearing 26 into the chamber formed inside the stator housing 22 between its partition 25 and the bottom wall of the recess in the end wall 21 of the main housing 20. This end of the armature shaft 28 has the driving disc 32 secured thereto so as to rotate therewith. Disc 32 has an annular flange 33 of lesser diameter than the inside diameter of the stator housing.

The bottom wall of the recess in the end wall 21 of the main housing 20 is centrally apertured to receive the bearing assembly 35. One end of a stub shaft 36 is journalled in bearing 35, the end of this stub shaft extending beyond the bearing having the armature disc 37 keyed thereto so that said disc, when rotating, will rotate the stub shaft 36, but is movable longitudinally relatively thereto. Disc 37 is parallel and in closely spaced relation with the flange 33 of the driving disc 32. It is greater in diameter than flange 33 but slightly less than the inside diameter of the stator housing 22, thereby providing a small air gap for the passage of magnetic lines of force between the disc 37 and stator housing 22. A magnet coil 38 is carried by a non-magnetic spool 39 surrounding the motor driven disc 32 and secured in the stator housing directly beneath the partition 25 therein.

The end of the stub shaft 36 to which the armature disc 37 is slidably attached is centrally recessed. A headed screw 40 is threaded in a central opening in the bottom wall of the recess in the stub shaft, the headed end of the screw being substantially flush with the side of disc 37 adjacent the driving disc flange 33. An abutment sleeve 41 is provided in the recess of the stub shaft, said sleeve having an outwardly extending flange resting upon the bottom surface of a central recess in the armature disc 37, and an inwardly extending, annular flange at its opposite end and normally spaced from the bottom of the recess in the stub shaft. A spring 42 surrounds the screw 40, one end abutting against the bottom surface of the head of screw 40, the other resting upon the inwardly extending flange on the abutment sleeve 41. This spring 42 thus yieldably urges the armature 37 into frictional engagement with the brake ring 43 secured to the bottom wall of the recess in the end wall 21 of the main housing 20.

The end of the stub shaft 36, opposite the end journalled in the bearing 35, is journalled in the bearing 45. The intermediate portion 46 of the stub shaft 36, between the two coaxial ends thereof, is eccentric to said end portions. Two bearing assemblies 47 and 48 are carried by the eccentric portion 46 of the stub shaft 36. These bearings 47 and 48 rotatably support a gear unit 49 providing the epicyclic gears 50 and 51, the former being larger than the latter.

The epicyclic gear 50 meshes with and operates in the ring gear 52 rigidly secured in the main housing 20. The epicyclic gear 51 of the gear unit 49 meshes with and operates in the internal ring gear 53 formed by a recess in the gear unit 54 which is journalled in two bearings 55 and 56 in the main housing 20. These bearings and gear unit 54 supported thereby are held in the main housing 20 by the retainer ring 57 threadedly received in the open end of the main housing 20.

The gear unit 54 has an interiorly threaded, central opening for receiving the threaded end of a tubular screw shaft 60. A pin 61, passing through the gear unit 54 and screw shaft 60 assures secure attachment of said unit to said shaft. This end of the screw shaft 60 is recessed to receive and support the bearing 45 in which one end of the stub shaft 36 is journalled.

Gear unit 54 has an outwardly extending, annular flange 58. On the annular, peripheral edge surface of the flange 58 a worm gear is provided having a gear tooth 59 of at least one and one-half (1½) convolutions.

The outer surface of the screw shaft 60 has a helical groove 61 extending from the threaded portion of the shaft to its opposite end. This groove 61 is substantially semi-circular in cross section.

A nut 65 slidably fits about the shaft 60, the inner annular surface of the nut having a helical groove 66 identical with and adapted to coincide with the annular groove 61 in the outer surface of the screw shaft 60 so that these coinciding nut and shaft grooves form a round, helical channel between the contiguous surfaces of said nut and shaft.

In order mechanically to connect the nut to the shaft so that rotation of one relatively to the other results in longitudinal movement of the nut on the shaft, a plurality of ball bearings 67 are provided in at least one and one-half convolutions of the round groove between the nut and shaft. This type of connection between a nut and shaft is detailedly illustrated and described in the copending application of Calvin J. Werner, Serial No. 468,475, filed December 10, 1942, now Patent No. 2,383,901, and inasmuch as an ordinary thread connection between the nut and shaft would suffice as far as the features of the present invention is concerned, no further or detailed description of this portion of the actuator will be made.

The nut 60 has a tubular extension 68 secured thereto to which the load, to be raised and lowered by the actuator, is adapted to be attached.

A dust guard tube 80 is attached at one end to the retainer ring 57 so as to surround the nut 65 and shaft 60. A dust seal 81 is carried by the nut and slidably engages the inner surface of the tube 80.

The gear unit 54 of the speed reducing gearing is utilized to drive the acuating mechanism of two limit switches which control the motor to limit the range of movement of the nut 65 on the screw shaft 60. The annular, peripheral surface of a flange 58 on said gear unit is provided with a worm gear tooth 59 having at least one and one half convolutions. This worm gear 59 operatively engages a pinion 100 rotatably supported on shaft 101 carried by the limit switch housing 102 which is attached to the actuator housing 20 in any suitable manner.

Two parallelly spaced brackets 103 and 104 are attached in the housing 102 by their angular feet 105 and 106 respectively. The stub shaft 101, which carries the pinion 100, is supported between two portions of brackets 103 and 104 which extend into an opening in the main actuator housing 20. These brackets 103 and 104 are held in proper spaced relation by rigid spacer posts 107.

Pinion 100 meshes with a gear 108 supported between and by brackets 103 and 104 in the following manner: Each bracket has an opening one in coaxial alignment with the other. A tube 109 is rotatably supported in the opening of bracket 103, said tube 109 having an annular flange 110 engaging the side of the bracket 103 facing bracket 104. A gear 111 is secured to the tube 109, said gear being clamped tightly against the flange 110 so as to be rotatable with the tube, by riveting the end of the tube over and against the outer surface of gear 111. A similar tube 115 is rotatably supported in the opening of bracket 104, said tube having an annular flange 116 against which gear 117, similar to gear 111, is tightly pressed by riveting the end of the tube 115 against the outer surface of the gear. In the Fig. 7, a side view of gear 111 shows it to have a single tooth 112. On each side of this tooth 112 and cut in the annular peripheral edge surface of the gear is a notch, the one on one side being numbered 113 and the other 114.

Extending coaxially from one side of gear 108 is a stub shaft 120 rotatably fitting into the tube 109. A similar stub shaft 121 extends coaxially from the opposite side of gear 108 and rotatably fits into the tube 115. Thus gear 108 is supported coaxially between single tooth gears 111 and 117. Both stub shafts 120 and 121 have their end portions split as at 122 and 123 respectively and both are centrally drilled and threaded to receive the respective screws 124 and 125. Directly under its head, each screw has a wedge shaped, tapering collar 126 and 127 respectively, which, when the screw is properly operated, is forced down into the split end of its shaft to expand the shaft and rigidly secure it to its respective tube. When screws 124 and 125 are unscrewed, their respective collars are withdrawn from their split shafts which consequently are permitted to contract and restore the respective tube rotatable relatively to the shaft therein. Thus the single tooth gear bearing tubes 109 and 115 are adjustably securable to the gear 108 by the respective screws 124 and 125.

Brackets 103 and 104 have two other coaxially aligned holes which are predeterminately displaced from the holes supporting tubes 109 and 115. A tube 130 is rotatably carried in the hole of bracket 103 and a similar tube 131 in the hole of bracket 104. The inner ends of these tubes abut. To stiffen them and hold them in coaxial alignment, a rod 132 is provided within the tubes and extends from one into the other and permits their relative rotation. A cam 133 is attached to the end of the tube 130 extending outside the bracket 103 in any suitable manner and a similar cam 134 is secured to the outer end of tube 131. Both cams 133 and 134 are so positioned relatively to their supporting brackets 103 and 104 respectively that they will align for engagement with the actuating buttons of limit switches 136 and 137 respectively. These limit switches are supported in the housing 102.

Each tube 130 and 131 has a gear press fitted thereon for purposes of rotating the tube. Gear 140 is so positioned on tube 130 as to be operatively engaged by the single tooth 112 of gear 111 and gear 141 is so mounted on tube 131 as to be engaged and operated by the single tooth of gear 117.

Figure 7:
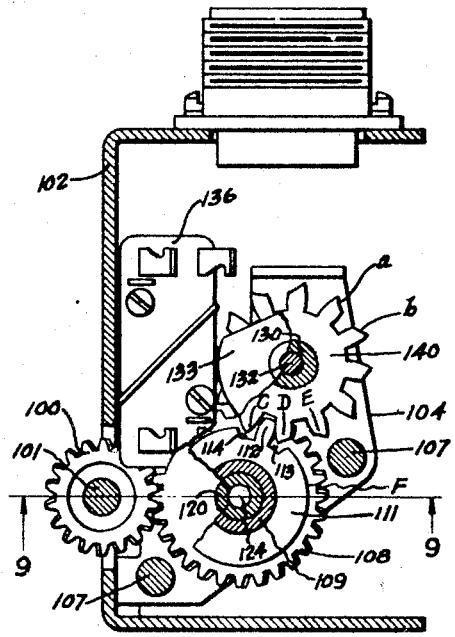
Fig. 7 is a side view, partly in section, of the control mechanism within its box, the box being shown in section.
Figure 8:
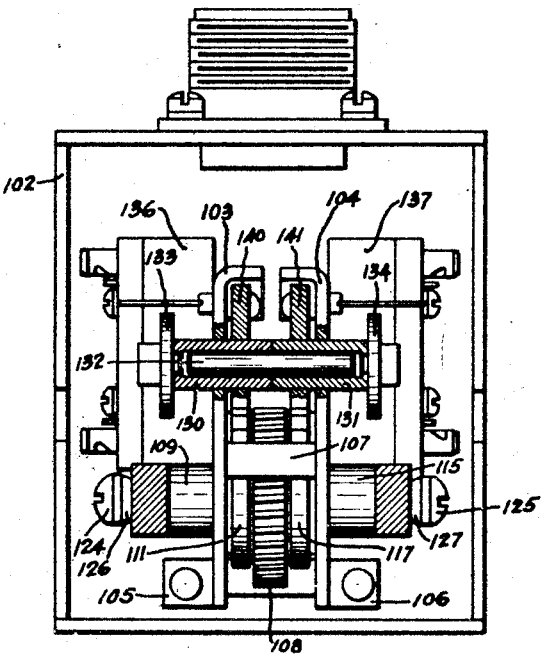
Fig. 8 is a front view of the mechanism shown in Fig. 7.
Figure 9:
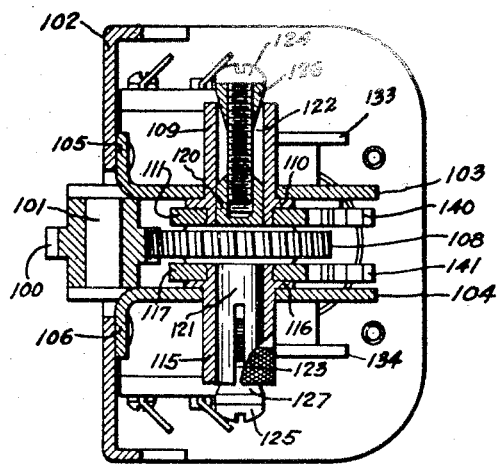
Fig. 9 is a part sectional view taken along the line 9—9 of Fig. 7.

The teeth of gears 140 and 141 are identically shaped for a particular reason and for the sake of brevity only one will be described detailedly. By referring to Fig. 7, it will be seen that each pair of adjacent teeth have their faces machined so as to present circular surfaces $a$ and $b$, for instance, having their common center on a line extending from the center of gear 140 and bisecting the space between the pair of gear teeth, the radius of said circular surfaces being slightly greater than the radius of the circular plain surface of gear 111. Thus, for instance, as shown in Fig. 7, when gear tooth 112 of gear 111 rotating counterclockwise, engages gear tooth C of gear 140, said gear will be rotated clockwise and eventually tooth D of gear 140 will be engaged by the edge of notch 113 following tooth 112 to rotate gear 140 clockwise so that the circular shaped faces of the teeth D and E of gear 140 coincide and circularly align with the circular plain face F of gear 111. Thus the gear 140 is locked against rotation until the single tooth 112 of gear 111, after a complete revolution of gear 111, engages tooth E of gear 140 again to turn said gear 140 clockwise to bring the pair of teeth following tooth E into coinciding, locking relation with gear 111. This same feature is provided between gears 117 and 141.

The cams 133 and 134 may have their operating faces relatively positioned so that the limit switches are actuated thereby in desired timed sequence. The present drawings show the working faces of the cams relatively set at substantially 180 degrees. The single tooth gears 111 and 117 may be adjusted relatively to each other and also relatively to their respective cam operating gears 140 and 141 to vary selectively the operation of the limit switches in accordance with the positions and degree of movements of the single tooth gears.

The limit switches control the operation of the electric motor 23. The magnet coil 28 is energized concurrently with the energization of the electric motor. When both are energized, the motor rotates and the magnet coil sets up magnetic forces which cause the armature disc 37 to be attracted and moved from frictional engagement with the braking ring 36 and into frictional engagement with the motor driven disc 33 so that said armature disc 37 is rotated by the motor. The armature disc is slidably keyed to the stub shaft 39 so consequently it will be rotated. Stub shaft 39 has an eccentric portion 46 upon which the epicycloidal gear unit 49 is rotatably mounted. Gear unit 49 consists of two gear portions 50 and 51, the former being the larger in diameter and operatively engaging the stationary ring gear 52, the smaller gear portion 51 meshing with an interior gear portion 53 provided on the gear unit 54 which is attached to the screw shaft 60 to rotate it. Thus it may be seen that the rotating motor is operatively connected to the screw shaft 60 to rotate it at a predetermined reduced speed. The motor is reversible so that the shaft 60 may be rotated in either direction. When said shaft is rotated in one direction, the nut 65 thereon will move longitudinally on said shaft in one direction for the nut is held against rotation by the member 80 which supports the load and is attached to the nut. Reversal of shaft rotation causes the nut to move longitudinally of the shaft in the other direction. A certain number of shaft revolutions are necessary to move the nut from one extreme position to another on the shaft. To avoid damage, the electric motor must be stopped as the nut reaches either of its extreme positions. The present invention provides sturdy and positively acting mechanism for doing this.

As the gear unit 54 is rotated, the worm gear 59 on the peripheral surface of flange 54 of said unit will rotate pinion 100 with which said worm gear meshes. Because of the relative sizes of worm gear 59 and pinion 100, and due to the fact that the screw on gear unit 54 is of such a low pitch, a comparatively large number of revolutions of the said gear unit 54 is necessary to rotate the pinion 100 a single revolution.

Pinion 100 meshes with and drives a gear 108 which is predeterminately larger than pinion 100 and thus a certain number of revolutions of pinion 100 is necessary to rotate gear 108 one revolution. The single tooth gears 111 and 117 are secured to gear 108 and rotate in unison therewith. Each revolution of single tooth gears 111 and 117 will rotate their cooperating gears 140 and 141 through an arc equal to the distance of two of their teeth. The present Fig. 7 illustrates a mechanism where six revolutions of the single tooth gears are necessary to turn their respective cooperating gears one complete revolution.

The cams 133 and 134 are set in the present device so that one will actuate its respective limit switch to open the motor circuit when the nut 65 reaches a predetermined position on the screw shaft 60 adjacent the gear unit 54 and the other cam will open its switch when the nut reaches a position on the screw shaft adjacent its end opposite gear unit 54. The movement of the nut from one to the other of these predetermined positions requires a certain number of revolutions of the shaft 60 inasmuch as gear unit 54 is directly attached to said shaft, it will rotate the same number of revolutions during this nut movement. Gearing including the worm screw 59, pinion 100, gear 108, single tooth gears 111 and 117 and their cooperating gears 140 and 141 are so designed and constructed that the revolutions of the screw shaft 60 and its gear unit 54, necessary to move the nut from one selected position to another, will actuate the cams 133 and 134 so that one will actuate its switch to open the motor circuit when the nut reaches one of its selected positions while the other cam operates its switch to open the motor circuit when the nut reaches the other of its selected positions. The opening of the motor circuit stops motor operation which causes shaft rotation to cease, thus stopping the linear movement of the nut at the selected position, while the closing of its gap in the motor circuit by the other switch prepares the circuit for the following cycle of motor operation during which the motor will turn the shaft in the reverse direction to cause the nut to move toward the other selected position.

In Fig. 2, the electric motor armature 29 and field windings 30a and 30b are shown. The source of electric power is shown to be a battery 200, one side grounded, the other side connected to the master switch 201. Switch 201 is also connected to the manually operable contact member 202 of a selector switch which has stationary contacts 203 and 204 with which said contact member 202 may selectively be engaged, one to cause the motor to rotate in one direction, the other to cause the motor to operate in the opposite direction. Wire 205 connects switch 201 with member 202. Contact 203 is connected to one contact 206 of one limit switch, for instance, 137, while the cooperating contact 207 of this switch is connected to the magnet winding 208 of the contactor 209. When energized this magnet winding, having one end grounded, will attract and operate the movable contact 210 to bridge and connect stationary contacts 211 and 212. Contact 212 is connected to one end of the motor field winding 30a, the other end of which is connected to the one side of the armature 29 and also with one end of the electromagnetic clutch winding 38, both opposite sides of the armature and winding 38 being grounded.

Stationary contact 211 of contactor 209 is connected with the wire 205 leading to the battery 200 through the master switch 201.

The stationary contact 204 of the selector switch, engageable by the manually operable contact member 202 of said selector switch, is connected with the one contact 215 of the limit switch 136. The contact 216 cooperating with contact 215, is connected with one side of the magnet winding 217 of the contactor 219, the other side of said winding being grounded. This contactor 219 has two movable bridging contacts 220 and 221 adapted to be actuated to bridge and connect stationary contacts 222—223 and 224—225 respectively when the winding 217 is energized. Stationary contact 222 is connected to one end of the motor field winding 30b, the other end of said field winding being connected to stationary contact 225 and also to the armature 29 and electromagnetic clutch winding 38. Contact 224 is connected to the power line 205 and contact 223 is grounded.

Fig. 2 shows the control cam 133 so positioned that it engages with the operating member of limit switch 136, thereby causing the contacts 206 and 207 of this switch to be separated and maintain open its gap in the control circuit of the motor. The control cam 134 of switch 137, on the other hand, is so positioned that it is disengaged from the operating member of this switch permitting the contacts 215 and 216 to remain closed and effect motor operation in the one direction. The manually operable contact 202 of the selector switch and the master switch 201 are shown completely open, so that, as shown, the motor cannot function.

To coincide Figs. 1 and 2, it must be assumed that limit switch 136 controls the electric motor as it operates to cause the nut 65 to move upwardly on the screw shaft 60 for with the nut in its extreme up position, as shown in Fig. 1, the switch 136 will have been actuated to open the motor control circuit to stop motor operation, while the limit switch 137 will have been closed to prepare the motor control circuit for the next nut descending rotation of the motor.

If, for purposes of description, the actuator of the present invention is used to open and close a cowling flap in an airplane, the position of the nut 65 in Fig. 1 would maintain the flap closed. To open the flap, the motor is operated to rotate the screw shaft 60 in the direction in which the nut would move downwardly on the shaft and thus open the flap. When the nut has reached a predetermined position in this directional movement, the flap would be wide open and the motor would be stopped automatically. To effect this, with the various elements of the device in positions as shown in Figs. 1 and 2 particularly, the operator closes the master switch 210 and then shifts the manually operable contact 202 into engagement with stationary contact 204. This permits current to flow from the battery 200 to and across the closed contacts 216—215 of limit switch 137 thence through the magnet winding 217 of contactor 219 back to the battery via the ground connections. Now winding 217 is energized to actuate the movable contacts 200 and 221 into bridging connections with their respective stationary contacts 222—223 and 224—225. Current from the power line 205 may now flow to contact 224, across the bridging contact 221 to contact 225 thence to juncture 226 where a split circuit is directed, one through field winding 30b to contact 222, bridge 220, contact 223 to ground, the other from 226 through the motor armature 29 and the electromagnetic clutch winding 38 to ground. With these circuits completed, the motor will rotate in one direction, the electromagnetic clutch will connect the motor with the speed reducing gearing connected to screw shaft 60 and the nut 65, attached to the flap by member 68, will move downwardly on said shaft to open the flap. As the speed reducing gearing operates to transmit the rotation of the motor to the shaft, the gear unit 54 of said gearing rotates the pinion 100 and pinion 100 will, through the intermediate gearing including gears 108, 111—117, 146—141, cause rotation of the control cams 133 and 134 at a definite relative speed.

At a predetermined time during the downward movement of the nut 65 or more specifically, after a predetermined number of revolutions of gear unit 54 to cause said nut to move downwardly, the connecting gearing will have actuated the cam 133 so that it disengages the operating arm of the limit switch 136 to permit said switch to move into circuit closing position. Closing of this switch at this time, that is, while switch 137 is still closed to effect rotation of the motor to move nut 65 downwardly, will have no effect, for contact 202 of the selector switch is still in contact with terminal 204 and must be moved into engagement with contact terminal 203 to render switch 136 effective to complete motor circuits.

When the speed reducing gearing and particularly the gear unit 54 thereof has been rotated the necessary number of revolutions to cause the nut 65 on shaft 60 to move from its extreme up position to its selected down position in which the flap is fully open, the gearing interconnecting gear unit 54 with cam 134 will have moved said cam so that it will engage and actuate the operating member of its limit switch 137 and thus open contacts 215 and 216 of said switch thereby breaking and circuit through the contactor magnet winding 217, deenergizing it and causing the bridging contacts thereof to move out of engagement with their respective stationary contacts. This breaks the motor circuits including motor field winding 30b and stops motor operation. Switch 201 and movable contact 202 of the selector switch need not be touched for under these circumstances no circuit is established. However, as soon as the contact 202 of the selector switch is moved into engagement with terminal contact 203 and switch 201 is closed, then, by virtue of the now closed limit switch 136, contactor 209 is rendered effective to establish motor circuits including field winding 30a which result in rotation of the motor to turn shaft 60 so that the nut thereon will again move upwardly to close the flap. During this movement, switch 137 will be closed and at a predetermined time, switch 136 will again be opened to stop motor operation.

One feature of the present limit switch actuating means resides in the ability of it being adjusted to control operation of said limit switches in accordance with any desirable degree of nut movement. By varying the relative positions of the cams to each other and to the single tooth gears which actuate them, operation of the switches "on" and "off" may be obtained at any desirable point in the movement of the nut on the screw shaft. The mechanism may be set to operate the limit switches after the nut has moved a considerable distance on a screw shaft and again said mechanism may be readjusted easily and without much trouble to operate the limit switches after the nut has moved only a slight distance in either direction on a screw shaft.

The mechanism is sturdy and positive, assuring safe and reliant control and it is of simple design requiring only a screw driver to loosen two members for permitting adjustments to be made.

While the embodiment of the present invention as herein disclosed, constitutes a preferred form, it is to be understood that other forms might be adopted, all coming within the scope of the claims which follow.

What is claimed is as follows:

1. In combination with a prime mover capable of operating in opposite directions, of a movable member operated thereby; a unitary device for controlling the operation of the prime mover in accordance with the movements of the movable member, said device comprising a pair of control members each operative to control the operation of the prime mover in a respective direction, a separate actuator for each control member; and a train of reduction gearing for driving said actuators, said gearing being connectible with the movable member so as to be driven thereby and comprising a connecting gear, an intermediate gear, a gear attached to each actuator, and a single tooth gear secured to each side of the intermediate gear, each single tooth gear being operative once in each revolution to engage and operate a gear attached to a respective actuator, to rotate said actuator a portion of a revolution.

2. In combination with a reversible electric motor, of a member rotated thereby; a housing; a unitary device in said housing for controlling the motor in accordance with the revolutions of the rotated member, said device comprising a pair of switches each operative to stop motor operation in one direction respectively; an actuator for each switch; and a plurality of cooperating reduction gears, one of which is operatively connected to the rotated member so as to be driven thereby and has a single tooth gear adjustably attached to each side thereof, each single tooth gear operatively engaging a gear secured to an actuator for operating it through a portion of a revolution for each complete revolution of the single tooth gear.

3. In combination with a reversible electric motor, of a member rotated thereby; a housing; a unitary device in said housing for controlling the motor in accordance with the revolutions of the rotated member, said device comprising a pair of switches each operative to stop motor operation in one direction respectively; an actuator for each switch; and a plurality of cooperating reduction gears comprising a main gear; a gear connecting the main gear to the rotated member; a single tooth gear adjustably attached to each side of the main gear, and a gear secured to each actuator and engaged by a single tooth gear during each revolution thereof, first to rotate the actuator gear through a predetermined portion of a complete revolution and then to lock said actuator gear against rotation.

4. In combination with a reversible electric motor, of a member rotated thereby; a housing; a unitary device in said housing for controlling the motor in accordance with the revolutions of the rotated member, said device comprising a pair of switches each operative to stop motor operation in one direction respectively; an actuator for each switch; and a plurality of cooperating reduction gears comprising a main gear, an intermediate gear connecting the main gear to the rotated member; a gear attached to each switch actuator; and a disc adjustably secured to each side of the main gear, each disc having a single tooth provided on its annular edge, said tooth operatively engaging and rotating a respective actuator gear through a predetermined portion of its complete revolution while said disc is rotating through one part of a revolution, the annular edge of the disc engaging two teeth of the actuator gear to lock it against rotation while the disc rotates through the remaining portion of its revolution.

5. In a device of the character described, the combination with a reversible electric motor; of a rotatable screw shaft having a non-rotatable nut threadedly supported thereon; means comprising an electromagnetic clutch and planetary gearing operative to connect the motor with the screw shaft; a switch operative to control the direction of motor rotation; two limit switches, each operative to effect starting and stopping of the motor in one direction respectively; and automatic means operative to actuate the limit switches in accordance with the direction and number of revolutions of the screw shaft, said means being driven by one of the planetary gears connecting the electric motor and screw shaft.

6. In a device of the character described, the combination with a reversible electric motor; of a rotatable screw shaft; a nut threadedly supported on the screw shaft and arranged against rotation; mechanism comprising electromagnetic clutch and planetary gearing operative to connect the motor with the screw shaft; a switch operative into one position or another to effect motor operation in one direction or another respectively; two limit switches, each operative to effect starting and stopping of motor operation in one direction respectively; and means automatically operative to actuate said limit switches in accordance with selected number of revolutions of the screw shaft in one direction or the other, said means being driven by one of the planetary gears connecting the motor and screw shaft and comprising cams for actuating the limit switches and intermediate driving gearing including lost motion gears adjustably maintained in driving positions to their cooperating gears.

7. In a device of the character described, the combination with a reversible electric motor; of a screw shaft; a nut threadedly supported on the screw shaft and arranged against rotation; mechanism operative to connect the motor with the screw shaft; a switch operative into one position or another to effect motor operation in one direction or another respectively; two limit switches, each operative to effect starting and stopping of motor operation in one direction respectively; and means automatically operative to actuate said limit switches in accordance with selected positions of the nut on the screw shaft, said means being driven by the mechanism connecting the motor and screw shaft and comprising cams for actuating the limit switches and cooperating gears for rotating the cams, said gears including two, single tooth gears, each adjustably secured to a driving gear and operative thereby to engage a cam timing gear, adjustment of said single tooth gears relative to the driving gear varying the effective time of the cams relatively to positions of the nut on the screw shaft.

8. In a device of the character described, the combination with a rotatable screw shaft threadedly supporting a non-rotatable nut; a prime mover for driving said screw shaft; planetary gearing connected to the screw shaft; an electromagnetic clutch energizable to connect the prime mover to the gearing; a device for controlling the magnetic clutch and the prime mover and effecting the operation of the prime mover in one direction or the other; and means for operating the control device to stop operation of the prime mover in one direction or the other as the nut reaches predetedmined positions on the screw shaft, said operating means comprising a pinion operatively connected to one of the planetary gears so as to be rotated thereby, a gear driven by the pinion, a single tooth gear attached to and rotatable by the last mentioned gear, and another gear, operatively attached to the control device, engageable by the single tooth gear and rotated a fraction of a complete revolution for each complete revolution of the single tooth gear whereby the control device is rendered effective to deenergize the magnetic clutch and stop prime mover operation after a predetermined number of revolutions of the screw shaft in one direction or the other.

9. In a device of the character described, the combination with a rotatable screw shaft having a non-rotatable nut; planetary gearing connected to the screw shaft; a prime mover for driving said screw shaft in either direction; a magnetic clutch energizable to connect the prime mover to the planetary gearing; a control device for effecting energization of the magnetic clutch and operation of the prime mover in one direction or the other, said device comprising a manually operable member to control directional operation of the prime mover and two separate members each operative to effect stopping of the prime mover; and means for operating said two separate members of the control device in timed relation to the position of the nut on the screw shaft, said means comprising a pinion driven by one of the planetary gears, a gear rotated by the pinion; a single tooth gear attached to the last mentioned gear so as to rotate therewith; and a final gear operatively connected to the two separate control members to actuate them, said final gear being engaged and rotated through a fraction of its complete revolution by a complete revolution of the single tooth gear, whereby one of the separate control members is actuated to stop prime mover operation in one direction and the other member to prepare a circuit for prime mover operation in the opposite direction.

10. In a device of the character described, the combination with a screw shaft threadedly supporting a non-rotatable nut; a reversible electric motor for driving said shaft; switches for controlling motor operation; and mechanism driven by the motor for actuating one or the other of said switches to stop motor operation when the shaft has rotated to move the nut into a predetermined position adjacent one or the other end of the shaft respectively, said mechanism comprising a pinion operatively connected to the screw shaft so as to be rotated thereby, a single gear mounted on a stub shaft and meshing with the pinion; a single tooth gear adjustably mounted on said stub shaft on each side of the single gear, a second stub shaft having a switch operating cam attached to each end thereof, and two gears attached to said second stub shaft, each of these last mentioned gears being engageable by the single tooth gear, once in each complete revolution thereof and turned through a fraction of a complete revolution in response to a complete revolution of the single tooth gear.

11. In a device of the character described, the combination with a screw shaft threadedly supporting a nut adapted to be secured to a non-rotatable element; a reversible electric motor for rotating the screw shaft; electric switches for controlling motor operation; and mechanism for operating said switches in timed relation with the position of the nut on the screw shaft, said mechanism comprising a pinion operatively connected to the screw shaft so as to be driven thereby, a comparatively larger gear meshing with the pinion and having a split stub shaft extending from each side thereof, a sleeve on each stub shaft, rotatably adjustable relatively thereto, a wedge screw in each split shaft for expanding the shaft to secure the sleeve thereon in adjusted position, a single tooth gear secured to each sleeve so as to be rotatable with the first mentioned gear, a cam shaft having a switch operating cam at each end thereof for engaging and operating the separate motor control switches, and a final pair of gears secured to the cam shaft, each of said pair of gears being engageable by a respective single tooth gear once in each complete revolution thereof to rotate the cam shaft through a predetermined fraction of its complete revolution in response thereof.

12. In a device of the character described, the combination with a screw shaft; a nut threaded on the screw shaft; a reversible electric motor for rotating the screw shaft to cause the nut to move longitudinally thereon; switches for stopping motor operation when the nut on the screw shaft reaches predetermined positions thereon in response to rotation of the shaft in one direction or the other; and mechanism for operating said switches in properly timed relation to the position of the nut on the screw shaft, said mechanism comprising, a pinion driven by the motor, an intermediate gear meshing with the pinion, a single tooth gear on each side of the intermediate gear, adjustably secured coaxially thereto so as to rotate therewith and having a notch on each side of the one tooth thereof providing a shifter shoulder on each side of said single tooth, a cam shaft having a switch actuating cam attached at each end thereof, said cams having their switch actuating dwells so displaced relatively to each other so that the switches operated thereby are never concurrently open or closed respectively, and two gears secured to the cam shaft, each adapted to be engaged operatively by a respective single tooth gear and operated through a fraction of a complete revolution by a full revolution of the respective single tooth gear, the faces of adjacent pairs of teeth of said cam shaft gears being circularly concaved to provide a circularly shaped surface of slightly greater radius than the radius of the untoothed portion of the single tooth gear with which said concaved faces of the pairs of teeth coincide after the cam shaft gear is actuated by the single tooth gear, and a shifter shoulder for locking the cam shaft gears against movement while not engaged by the single tooth of the single tooth gear.

13. In a device of the character described, the combination with a reversible motor for driving a screw shaft having a nut threadedly supported thereon; of a casing for housing said shaft and its driving motor; and a box attachable to said casing, said box containing mechanism for controlling the shaft driving motor in accordance with the position of the nut on said screw shaft, said mechanism comprising a pinion supported by the box and operatively connected to the screw shaft when the box is attached to the casing, a single gear in the box meshing with said pinion, a single tooth gear adjustably and coaxially secured thereto on each side thereof, a cam shaft, a cam at each end of the cam shaft; two gears attached to the cam shaft each adapted to be engaged and operated through a predetermined portion of a complete revolution by a single tooth gear during each complete revolution thereof; and switches in the box engaged and operated by the cams respectively to stop motor operation in accordance with a predetermined number of screw shaft rotations in one direction or the other respectively.

14. In a device of the character described, the combination with a screw shaft threadedly supporting a non-rotatable nut; of a prime mover capable of operating in two directions; means operative to connect the prime mover with the shaft to effect operation of the shaft in two directions; a control device for the prime mover; said mechanism operative to actuate the control device for stopping the prime mover in accordance with the position of the nut on the shaft, said mechanism comprising a cam operative to engage and operate the control device at one time when said cam moves in one direction and at another time when said cam moves in the other direction, and cooperating gearing connecting the cam with the screw shaft, said cooperating gearing having a lost motion gear adjustably secured to its driving gear and once in each revolution thereof, to engage and operate the gear directly connected to the cam through a predetermined arc of its complete cycle of rotation.

15. In a device of the character described, the combination with a reversible electric motor; of a screw shaft; a nut threadedly supported on the screw shaft and arranged against rotation; mechanism operative to connect the motor with the screw shaft; a switch operative into one position or another to effect motor operation in one direction or another respectively; two limit switches, each operative to effect starting and stopping of motor operation in one direction respectively; and means automatically operative to actuate said limit switches in accordance with selected positions of the nut on the screw shaft, said means being driven by the mechanism connecting the motor and screw shaft and comprising two cams, one for operating each limit switch and cooperating gears, one of which has a stub shaft extending from each side thereof and upon each of which a single tooth gear is adjustably attached, said single tooth gears each being operated by the supporting gear to engage and actuate a cam rotating gear, alteration in the relative position of a single tooth gear on the supporting gear varying the operation of a respective limit switch relative to the position of the nut on the screw shaft.

16. In a device of the character described, the combination with a reversible electric motor; a source of electric power; of a rotatable screw shaft driven by the motor; a selector switch movable into one or the other of two positions for selecting direction of motor operation; two control switches each adapted when closed and the selector switch is in proper position, to be connected in circuit with a source of power for rendering the motor operative in a certain direction, and when opened, to stop motor operation; and means driven by the screw shaft for actuation of the two control switches to open or close their respective circuits in accordance with the direction and number of revolutions of the screw shaft, said means comprising a pair of control members each operative to control the operation of the prime mover in a respective direction, a separate actuator for each control member; and a train of reduction gearing for driving said actuators, said gearing being connectible with the movable member so as to be driven thereby and comprising a connecting gear, an intermediate gear, a gear attached to each actuator, and a single tooth gear secured to each side of the intermediate gear, each single tooth gear being operative once in each revolution to engage and operate a gear attached to a respective actuator, to rotate said actuator a portion of a revolution.

GEORGE W. JACKSON.

REFERENCES CITED

The following references are of record in the file of this patent:

UNITED STATES PATENTS

| Number | Name | Date |
| --- | --- | --- |
| 1,578,655 | Goggins | Mar. 30, 1926 |
| 2,114,013 | Ball | Apr. 12, 1938 |
| 1,245,574 | Dean | Nov. 6, 1917 |
| 2,305,928 | Littell | Dec. 22, 1942 |
| 2,391,702 | Hill | Dec. 25, 1945 |

Certificate of Correction

Patent No. 2,418,351. April 1, 1947.

GEORGE W. JACKSON

It is hereby certified that errors appear in the printed specification of the above numbered patent requiring correction as follows: Column 9, line 49, for "and" before "circuit" read *the*; column 14, line 30, claim 14, for "said" before "mechanism" read *and*; and that the said Letters Patent should be read with these corrections therein that the same may conform to the record of the case in the Patent Office.

Signed and sealed this 22nd day of July, A. D. 1947.

[SEAL]

LESLIE FRAZER,
*First Assistant Commissioner of Patents.*